US 7,392,321 B1

(12) United States Patent
Wolf et al.

(10) Patent No.: US 7,392,321 B1
(45) Date of Patent: Jun. 24, 2008

(54) METHOD AND SYSTEM FOR EVALUATING QUALITY OF SERVICE FOR TRANSACTIONS OVER A NETWORK

(75) Inventors: Ronald E. Wolf, Palo Alto, CA (US); Menachem Ahikam Oron, Sunnyvale, CA (US); Adnan Asar, Union City, CA (US); Maria Rozen, San Mateo, CA (US); Anastasia Divnich, Menlo Park, CA (US)

(73) Assignee: Keynote Systems, Inc., San Mateo, CA (US)

( * ) Notice: Subject to any disclaimer, the term of this patent is extended or adjusted under 35 U.S.C. 154(b) by 663 days.

(21) Appl. No.: 10/114,921

(22) Filed: Apr. 2, 2002

Related U.S. Application Data

(60) Provisional application No. 60/294,863, filed on May 30, 2001.

(51) Int. Cl.
*G06F 15/16* (2006.01)
(52) U.S. Cl. .................. 709/232; 709/203; 709/219; 709/224; 709/227; 709/229; 714/47
(58) Field of Classification Search ......... 709/200–204, 709/217–219, 223–225; 707/1, 10
See application file for complete search history.

(56) References Cited

U.S. PATENT DOCUMENTS

| 5,557,746 | A | | 9/1996 | Chen et al. ............. 395/200.06 |
|---|---|---|---|---|
| 5,657,450 | A | | 8/1997 | Rao et al. .................. 395/610 |
| 5,696,701 | A | | 12/1997 | Burgess et al. ......... 364/551.01 |
| 5,696,965 | A | | 12/1997 | Dedrick ...................... 395/610 |
| 5,754,772 | A | | 5/1998 | Leaf ....................... 395/200.33 |
| 5,761,486 | A | | 6/1998 | Watanabe et al. ........... 395/500 |
| 5,761,663 | A | | 6/1998 | Lagarde et al. ................ 707/10 |
| 5,774,670 | A | | 6/1998 | Montulli ................ 395/200.51 |
| 5,790,798 | A | | 8/1998 | Beckett, II et al. ..... 395/200.54 |
| 5,790,977 | A | | 8/1998 | Ezekiel ....................... 702/122 |
| 5,796,633 | A | | 8/1998 | Burgess et al. ......... 364/551.01 |
| 5,796,952 | A | | 8/1998 | Davis et al. ............ 395/200.54 |
| 5,802,106 | A | | 9/1998 | Packer ........................ 375/225 |
| 5,805,815 | A | | 9/1998 | Hill ....................... 395/200.48 |
| 5,809,250 | A | * | 9/1998 | Kisor ......................... 709/227 |
| 5,974,572 | A | * | 10/1999 | Weinberg et al. ............. 714/47 |
| 6,006,260 | A | | 12/1999 | Barrick, Jr. et al. ......... 709/224 |
| 6,078,956 | A | * | 6/2000 | Bryant et al. ............... 709/224 |
| 6,138,157 | A | | 10/2000 | Welter et al. ................ 709/224 |
| 6,157,618 | A | | 12/2000 | Boss et al. .................. 370/252 |
| 6,178,449 | B1 | * | 1/2001 | Forman et al. ............. 709/224 |
| 6,286,046 | B1 | * | 9/2001 | Bryant ....................... 709/224 |
| 6,615,266 | B1 | * | 9/2003 | Hoffman et al. ............ 709/227 |

* cited by examiner

*Primary Examiner*—Yves Dalencourt
(74) *Attorney, Agent, or Firm*—Cindy Kaplan

(57) ABSTRACT

A method of recording a transaction over a network generally includes staring a recorder, sending a request for information from a computer to an information source over the network to begin the transaction, interacting with the information source over the network to complete the transaction, and stopping the recorder. The recorded transaction is played back and feedback is provided on the recorded transaction. The recorded transaction is configured for use by a data acquisition agent operable to execute the recorded transaction with the information source and collect performance measurements for the transaction.

36 Claims, 11 Drawing Sheets

METHOD AND SYSTEM FOR EVALUATING QUALITY OF SERVICE FOR TRANSACTIONS OVER A NETWORK

RELATED APPLICATION

The present application claims the benefit of U.S. Provisional Patent Application Ser. No. 60/294,863, filed May 30, 2001.

BACKGROUND OF THE INVENTION

The present invention relates generally to evaluating quality of service provided over a network, and more particularly, to systems and methods for determining the amount of time it takes to perform a sequence of operations over a network such as the Internet.

With the explosive growth of the Internet, increased traffic has caused the performance experienced by users making connections over the Internet to vary widely. The longer it takes a user to download information from a web site, the more likely the user is to go to a competitor's web site. Thus, it is important for companies to be aware of the amount of time it takes users to download information from their Internet sites so that they can quickly identify problems, upgrade their equipment, modify the content of their web site, or otherwise increase the speed of delivery of information at their web site.

Many factors influence the performance of a connection including the user's modem and other equipment, the type of server, the load on the server, and the Internet service provider used. The first step in evaluating connection performance is to obtain reliable information regarding performance characteristics such as the time required to download web pages or other information across a connection.

One approach to measuring web site performance is to connect measurement agents to the Internet at various geographic locations. This approach is described in U.S. Pat. No. 6,006,260 which is incorporated herein by reference in its entirety. The system disclosed therein uses a browser agent to send an HTTP GET command to a server and then record the amount of time it takes to complete transmission of the data. The agents evaluate the performance of a web site by measuring the amount of time it takes to download a web page. Due to their remote location, the agents are able to evaluate the performance of a web site from the end user's perspective, and are able to measure the effects of the intervening network itself in addition to the performance of the web server. As a result, the performance seen by an agent can provide a reasonable approximation for the service experienced by customers connecting to the Internet at approximately the same location, and at approximately the same time as the agent.

While this is a useful indicator of server performance, it would further be useful if a process could be developed that could measure web server performance during a typical session where the web server is accessed by a user to do multiple tasks in a sequential order. In addition to measuring page download, many web sites, such as e-commerce web sites, are interested in measuring multi-step transactions. For example, systems that simply measure page downloads are not able to measure the time it takes for a user to perform a series of transactions which require the agent to send information back to the web server to complete the transaction. Common on-line transactions include booking an airline reservation, executing a stock transaction, checking the balance in a bank account, and purchasing a book or CD. In order to evaluate the performance of these sites, measurements are required for the entire transaction, not just the download time for a single page. For example, a user may want to access a web site having financial information. The user may login to the web site and then type in a stock symbol and retrieve a graph of the stock corresponding to the stock symbol. Next, the user may look up one or more other stock symbols and add those to the chart for the purpose of comparing the stocks. Finally, the user exits the web site, thus ending the session. Complex transactions such as making a stock trade or searching for information involves a series of web pages and exercises multiple back end systems. Problems with any of these systems may cause the transaction to fail or slow down.

One method for recording and analyzing transactions over a network such as the Internet is disclosed in U.S. patent application Ser. No. 09/475,765, filed Dec. 30, 1999, which is incorporated herein by reference in its entirety.

One important feature in recording transactions is providing feedback during the recording so that the user knows that they have successfully created a recording of a transaction. It would also be helpful if the user could provide annotations within the recording to aid in creating a script from the recording.

SUMMARY OF THE INVENTION

A method and system for evaluating quality of service over a network are disclosed.

A method of recording a transaction over a network generally comprises starting a recorder, sending a request for information from a computer to an information source over the network to begin the transaction and interacting with the information source over the network to complete the transaction. The recorder is stopped and the recorded transaction is played back and feedback is received on the recorded transaction. The recorded transaction is configured for use by a data acquisition agent operable to execute the recorded transaction with the information source and collect performance measurements for the transaction.

A computer program product for recording and measuring a transaction over a network generally comprises computer code that starts a recorder and sends a request for information from a computer to an information source over the network to begin the transaction. The product further includes computer code that interacts with the information source over the network to complete the transaction, stops the recorder at the end of the transaction, and plays back the recorded transaction. Computer code then sends the recording of the transaction to a node on the network in communication with a data acquisition agent operable to execute the recorded transaction with the information source and collect performances measurements for the transaction. A computer readable storage medium is provided for storing the codes.

A system for recording a transaction between two or more computers in a computer network generally comprises a recorder configured to record a transaction between a user computer and a host computer and a playback application configured to playback the recorded transaction on the user computer and provide feedback regarding the recorded transaction. The system further includes memory configured to at least temporarily store the recorded transaction and a delivery device operable to send the recorded transaction to a central computer configured to pass the recorded transaction to at least one data acquisition agent operable to execute the recorded transaction and collect performance measurements for the transaction.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
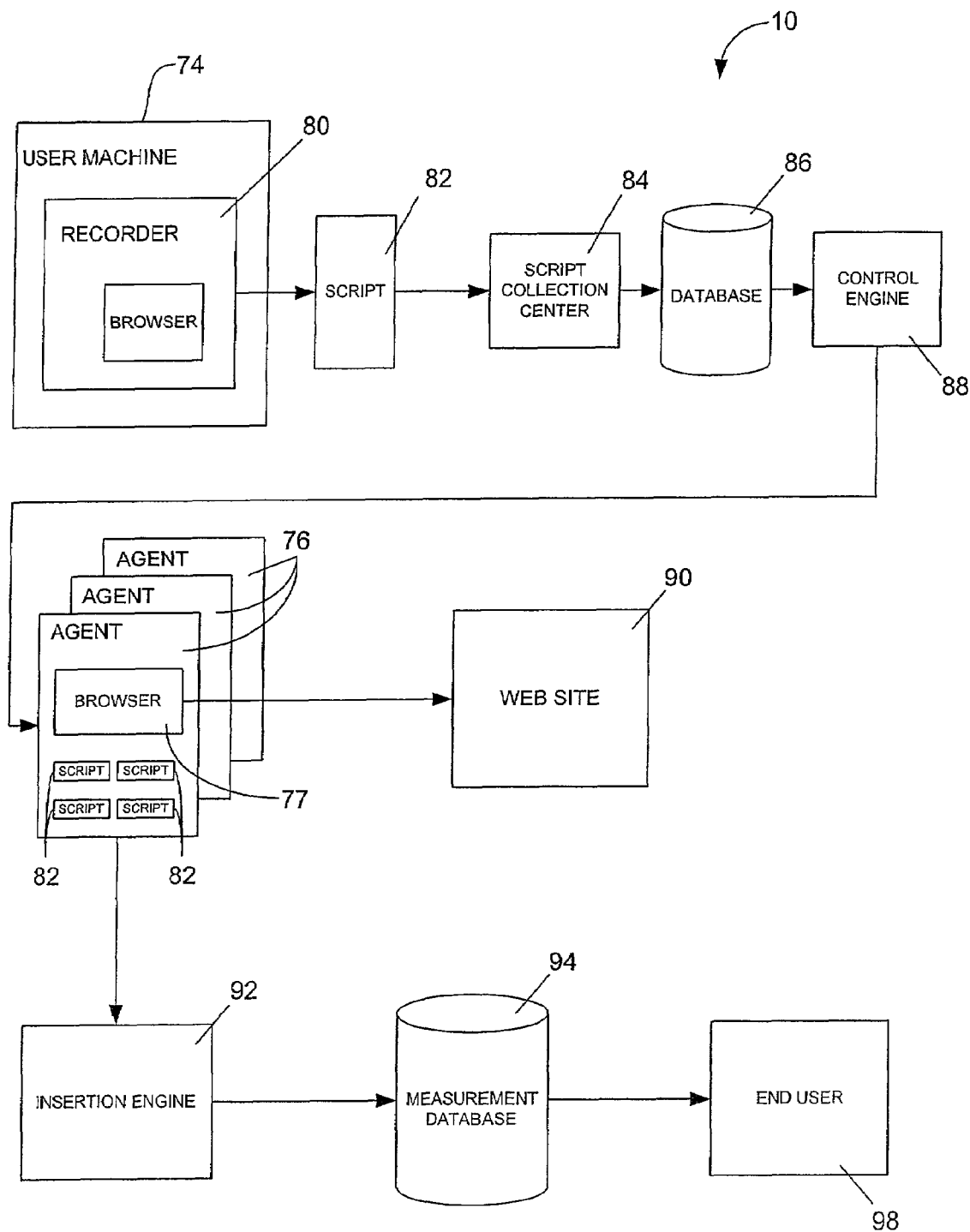
FIG. 1 is a block diagram of a system for measuring download time of a transaction at a Web site.

Referring now to the drawings, and first to FIG. 1, a system for recording and measuring multi-sequenced web-site transactions is schematically shown and generally indicated at 10. Transactions such as booking an airline reservation, executing a stock transaction, checking the balance in a bank account, or purchasing a book or CD may be analyzed, for example. The term transaction as used herein includes requesting information from an information source (e.g., web server) and interacting with the information source. The interaction may include entering a search query or selecting a product for purchase and entering credit card information, for example. The measurements may be used to analyze how content and back end applications perform at various times and locations. For example, the system 10 may be used to measure the performance of a web site transaction to determine if users are receiving adequate performance and help in debugging problems with a site when they occur. The system 10 allows web site owners to monitor and optimize the performance of transactions by online customers and manage the effect of content and back end applications by evaluating how long it takes to execute a multi-page interactive transaction. The system 10 may be used to detect problems such as content problems, web server problems, back end system problems, backbone problems, network problems, or combinations thereof. By breaking content download time into its constituent elements, the source of delays may be identified. Also, the geographic distribution of agents described below, allows for the identification of problems based on location. The data gathered by the system 10 provides information about the relationship between web content and Internet network delays which may be used by web architects to optimize page design. The websites measured may use technologies such as JavaScript, DHTML (Dynamic HTML), and server farms, for example.

As described in detail below, a recorder 80 of the present invention is configured to allow a user to review the recording and receive feedback so that the user knows that a transaction has been successfully recorded. The system also allows users to include comments within the transaction so that others can interpret the intent of the user in making the recording and ensure that the recorded transaction corresponds to the actual transaction the user desires to monitor and measure.

Figure 2:
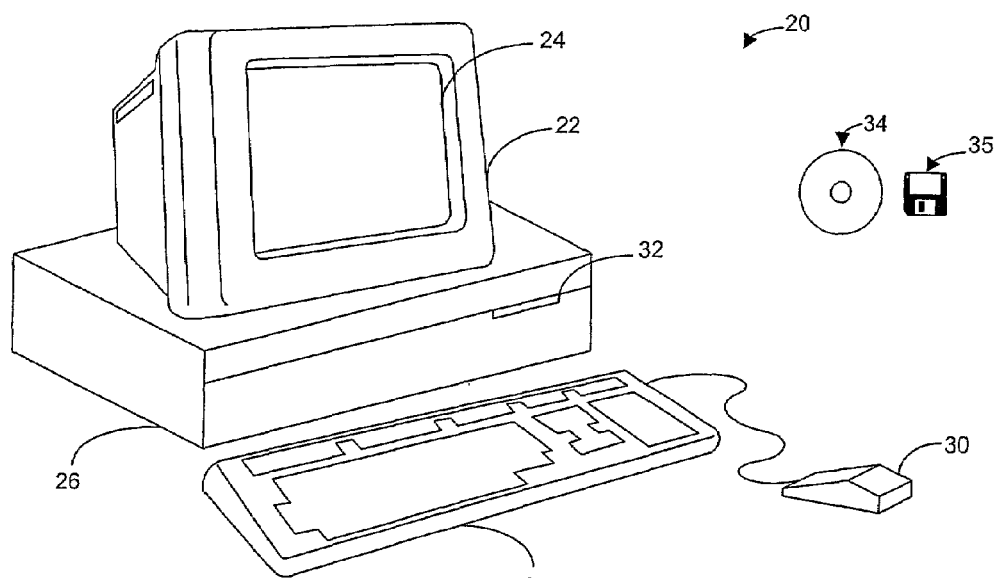
FIG. 2 is a schematic illustrating an example of a computer system that can be utilized to execute software of an embodiment of the invention.

FIG. 2 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 3) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 3:
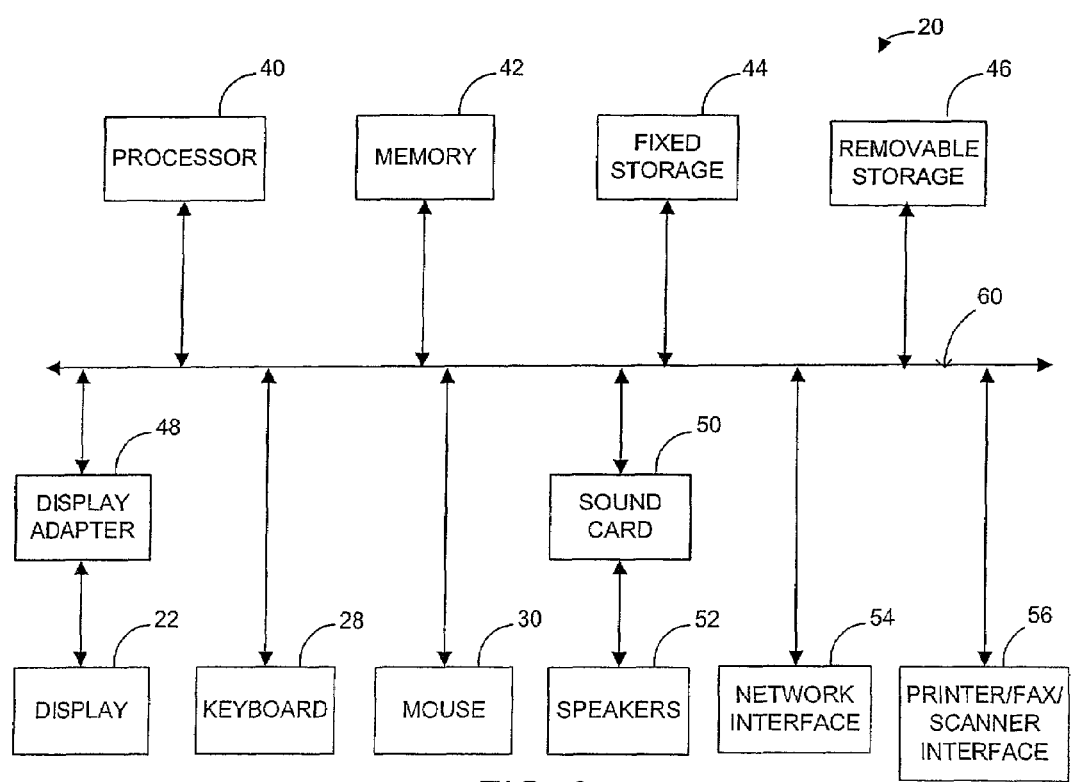
FIG. 3 is a system block diagram of the computer system of FIG. 2.

FIG. 3 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 3. However, these arrows are only illustrative of one possible interconnection scheme serving to link the subsystems. For example, a local bus could be utilized to connect the central processor 40 to the system memory 42 and display adapter 48. Computer system 20 shown in FIGS. 2 and 3 is but an example of a computer system suitable for use with the invention. Other computer architectures having different configurations of subsystems may also be utilized. For example, the agent computer systems typically do not include a display 22, screen 24, keyboard 28, or mouse 30.

Communication between computers within the network is made possible with the use of communication protocols, which govern how computers exchange information over a network. The computer may include an input/output circuit used to communicate information in appropriately structured form to and from the parts of computer and associated equipment. Connected to the input/output circuit are inside and outside high speed Local Area Network interfaces 54, for example. The inside interface may be connected to a private network, while the outside interface may be connected to an external network such as the Internet. Preferably, each of these interfaces includes a plurality of ports appropriate for communication with the appropriate media, and associated logic, and in some instances memory.

Figure 4:
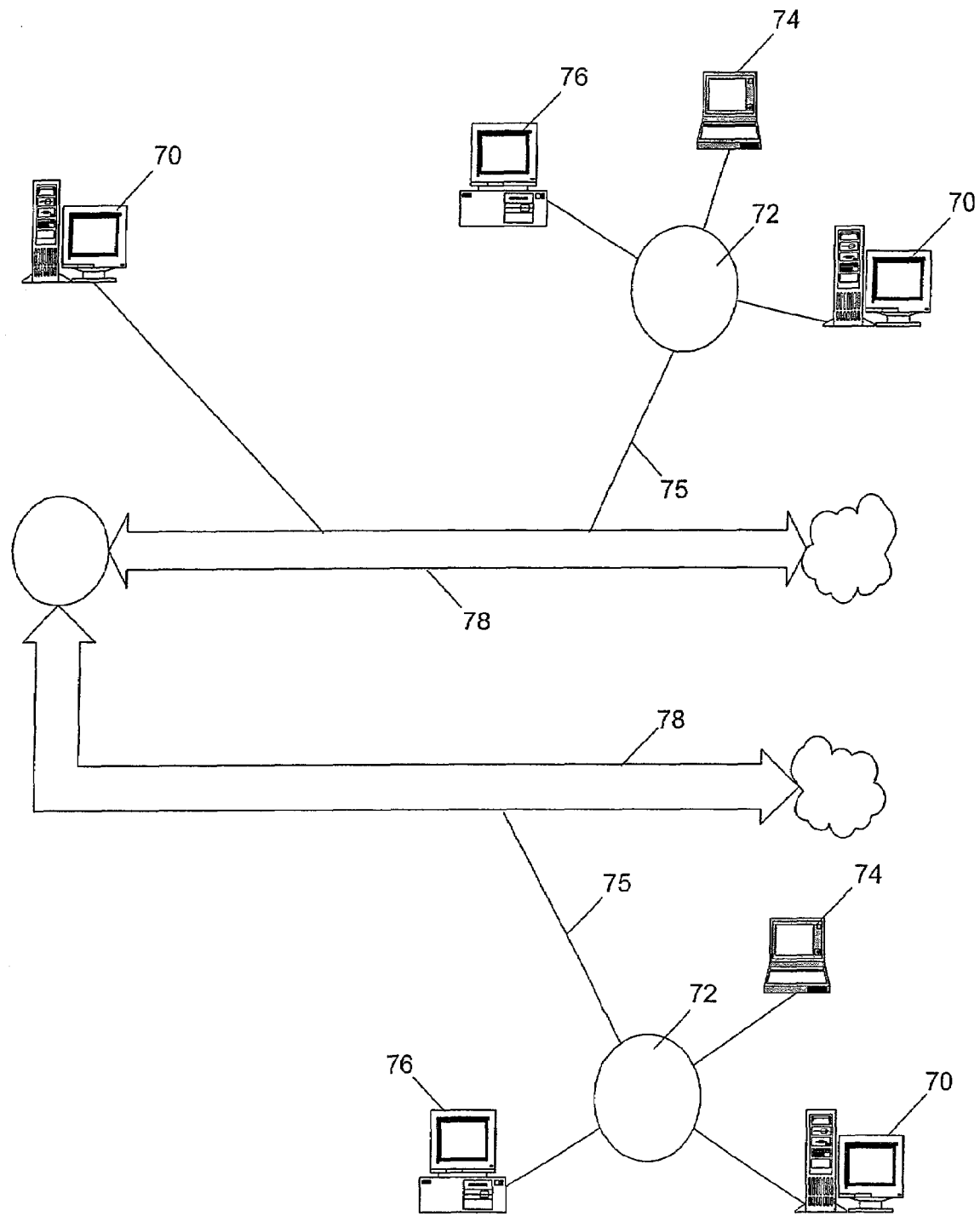
FIG. 4 is a schematic illustrating components within a network on which performance data can be collected in accordance with the present invention.

As shown in FIG. 4, the system may be used to collect performance data on a network. In one embodiment, the network is the Internet and the information is transmitted in the form of web pages. FIG. 4 illustrates the interconnection between components within the network. The network includes one or more servers 70 for hosting one or more network sites. The servers 70 are typically connected to the network at points of presence (POPs) 72, established by network service providers at a variety of geographic locations. Also connected to the network via POPs 72 are multiple users 74 and data acquisition agents 76. Transmission medium such as T1 and T3 lines, dial-up, DSL (Digital Subscriber Line), cable connections, or wireless transmission may provide interconnections between the components within the network. A given geographic location, such as a metropolitan area, will typically contain multiple POPs 72 established by different network service providers. Each POP 72 may supply Internet connections to one or more users 74, servers 70, and agents 76. As illustrated in FIG. 4, the POPs 72 may be connected directly to an Internet backbone 78 via a relatively high-speed transmission medium 75 such as a T1 line. The connection between POPs 72, users 74, servers 70, and agents 76 may include any suitable transmission media, including, but not limited to, public telephone lines, T1 lines, T3 lines, and Ethernet connections.

It is to be understood that the network configuration and interconnections shown in FIG. 4 and described herein, are provided for purposes of illustration only. One of ordinary skill in the art will readily appreciate that the present invention may be practiced on networks more or less complex than that shown, in accordance with the teachings contained herein.

Referring again to FIG. 1, the system 10 generally includes a recorder 80 used to record a transaction on the network and create a script file 82, a script database 86 for storing the script files, a preference engine 88 for sending the script to a plurality of agents 76 which execute the script at a web site 90, collect download timing information, and send the timing information to an insertion engine 92, and a measurement database 94 for storing the timing information. The agents deliver transaction measurement data to a backend server, periodically queries the backend for new preference data, executes transactions according to the instructions delivered from the backend, and measure transaction time. The agent 76 may interact with more than one web site 90 during a single transaction.

In order to collect data on a specific transaction for which download information is desired, the transaction is first recorded using the system recorder 80 (FIG. 1). The recorder 80 creates the script file 82 and submits it to an operations center 84, where the script 82 is tested and entered into the script database 86. The script database 86 creates a list of scripts 82 for each of the agents 76 to run. The script files 82 are executed by the agents 76 which monitor the session and extract data relating to the performance of the server during the session. The agent 76 preferably passes one script 82 at a time to its browser 77, however, it may pass more than one script at a time. Each agent 76 sends download timing information gathered during execution of the script 82 to the insertion engine 92 located within a data collection server, which transfers the data to the measurement database 94. The measurement database 94 is preferably contained within a database server that is located at a download timing service center.

The transaction recorder 80 is used to capture inputs to forms included on web pages and mouse clicks made by a user, as described below. The recorder captures user interactions with a website so that the agent 76 can generally repeat the transaction. For example, if a dialog box or login dialog box pops-up during a transaction execution, the agent simulates clicking on a default button of the dialog box. The dialog box then disappears from the screen. After a transaction is recorded, it can be played back to allow the user to review and validate the script, as described below. Once a script file 82 is created by the recorder 80 it is sent to the operations center 84 where it is tested to ensure that the script functions properly (e.g., does not create errors due to missing or inaccurate data or non-existent URLs). The script may be run periodically for an entire day, for example, to make sure it performs correctly at different operating times and when the servers are operating at different capacity levels. After the script 82 successfully passes testing, it is entered into the script database 86 along with other recorded script files 82. The preference engine 88 assembles a list containing all the scripts 82 within the script database for each agent 76. The list may also include a specific time and/or interval that each script is to be run. For example, the agent may be instructed to run each script one after another, run a script at a certain time interval after it begins to run the list of scripts, or run a script at a specific time. The preference engine 88 may send different lists to different agents 76 or groups of agents. The preference engine preferably updates the list at regular intervals to add new scripts or remove old scripts. The order that the scripts are executed may also be changed. Preferably, the agent 76 requests a new list of scripts 82 from the preference engine 88 at a specified interval (e.g., every hour).

If an agent 76 does not receive a new list of scripts 82 from the preference agent 88 it may run the old list again. The agent 76 preferably includes a monitoring device which monitors the last time the agent received a list of scripts 82 and the time at which the scripts were run. If an agent 76 is not able to send measurement data the agent will store the data until it can be sent. The scripts 82 may be encrypted before being sent to the agent 76 and then decrypted by the agent. It is to be understood that the management set up of the agents may be different than described herein. The agents 76 are preferably remotely managed.

The agents 76 are configured to receive commands (e.g., plurality of scripts 82 and instructions when to run or what order to run the scripts) from one or more external servers, automatically obtain web performance measurements, and send data to one or more databases 94 and servers. The agents 76 repeatedly access the web site 90, making repeated measurements and sending multiple reports to the data collection server. The agents 76 communicate the performance data that they have collected to the server via network connections and may forward the data to the server as soon as the data has been gathered, temporarily store the data before forwarding it to the server, or communicate data to the server in some other manner. The insertion engine 92 receives the performance data sent by the agents 76 and stores the data in one or more of the measurement databases 94. The insertion engine 92 may pre-process some or all of the data before storing it in the database 94, or it may simply pass the data on to the database directly. As further described below, end users 98 may query the database 94 to request performance parameters for a particular web site 90 and transaction.

In a preferred embodiment, the agents 76 obtain data from a server by sending an HTTP GET or POST request, for example, to the server and measuring how long it takes to download the requested information, starting from the time that the HTTP GET request was sent. When the agent 76 sends an HTTP GET request to the web server, the web server responds to the request by sending an HTML page. The agents 76 may begin to execute a script 82 by simply requesting a web page using the domain name (URL) for that page, similar to the way a human user typically requests a web page, and the network's domain name system (DNS) translates the domain name into an internet protocol (IP) address for routing to the server. Preferably, the agent 76 does not cache any files or DNS lookups between transactions. The agent may run a script in two modes, first time mode or experienced user mode. In the first time mode each transaction is performed as if it is being done by a first time user. No cookies are stored and nothing is cached. During a single transaction, however, components such as GIFs and DNS lookups may be cached. In the experienced user mode, cookies may already be stored and other information may be cached to simulate a return user running a transaction. Additional details regarding the measurement of download timing by agents may be found in U.S. patent application Ser. No. 08/868,616, referenced above, which is incorporated herein by reference in its entirety. However, any suitable method of measuring download times or other performance data with an agent may be used, without departing from the scope of the invention.

The agents 76 may comprise Windows NT computers which are connected directly to POPs 72 at facilities throughout the network, for example. The agents 76 preferably include a processor and memory, which may include high speed random-access memory (RAM) and non-volatile-storage such as a magnetic disk and read only memory (ROM). It will be understood that the agents 76 may comprise any suitable device and may be located at various geographic locations, without departing from the scope of the invention. The agents may run on any type of Internet connections, such as T1 lines, dial-up, DSL, 56 Kb, cable modem, or wireless, for example.

The agent preferably uses an Internet browser 77 such as Internet Explorer. The browser commands may be modified by the agent 76 so that information buried within the web page may be obtained, as is well known by those skilled in the art.

Figure 5:
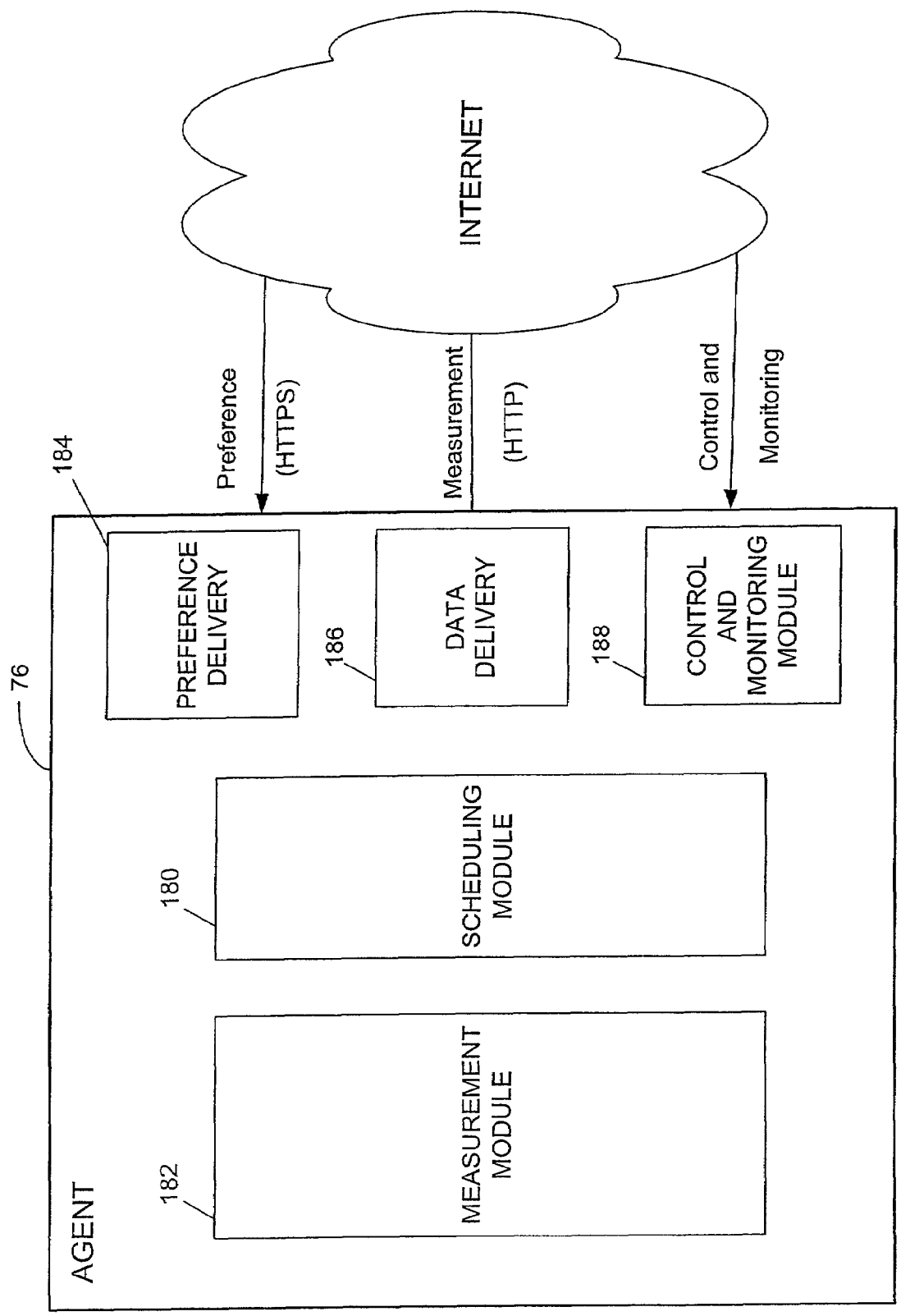
FIG. 5 is a schematic illustrating details of an agent of the system of FIG. 1.

FIG. 5 illustrates additional detail of agent 76. The agent 76 preferably includes a scheduling module 180, measurement module 182, and backend modules including preference delivery 184, data delivery 186, and control and monitoring modules 188. The scheduling module 180 schedules and distributes transactions. It controls when a transaction is executed. The scheduler preferably runs on GMT time so that agents located throughout the world can operate based on the same reference time. The scheduler 180 may be a system such as disclosed in U.S. patent application Ser. No. 09/558,414, filed Apr. 24, 2000 or any other suitable system. The scheduler 180 reads preferences from a file generated by the preference delivery module 184. It also generates a measurement data file that contains aggregated measurement data from agents 76. The measurement module 182 collects component performance data and detailed HTTP error code. The measurement module 182 includes a dialog box manager which probes a windows desktop periodically for dialog boxes that are generated as a script is played and cleans them up so that they will not interfere with navigation. The dialog manager may be configured such that it can anticipate the dialog box that will appear based on the recorded transaction that is running and take appropriate action to clean the dialog boxes up. Communication among the modules is preferably done through text files, but other formats may be used.

The preference delivery module 184 polls a preference server via HTTPS for the latest preference file and temporarily stores it for the scheduling module 180 to pick up. The data delivery module 186 picks up the data file generated by the scheduling module 180 and delivers it to a central data server via HTTP or HTTPS. The file format for the preference and data is preferably in XML for extensibility, but other formats may be used.

The measurement database 94 preferably contains the performance data obtained by the agents 76, collected by the insertion engine 92, and forwarded to the database 94 (FIG. 1). The data may include a plurality of records, each including a plurality of fields. The fields may include, for example, an agent identifier, a script identifier, date/time stamp indicating the date and time when the timing measurement was taken, and timing download information, as described below.

Figure 6:
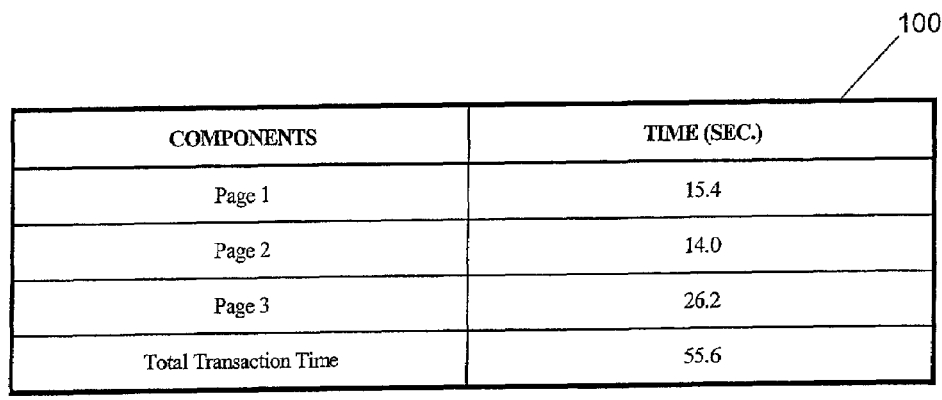
FIG. 6 is an exemplary table illustrating top level page download times for a transaction.
Figure 7:
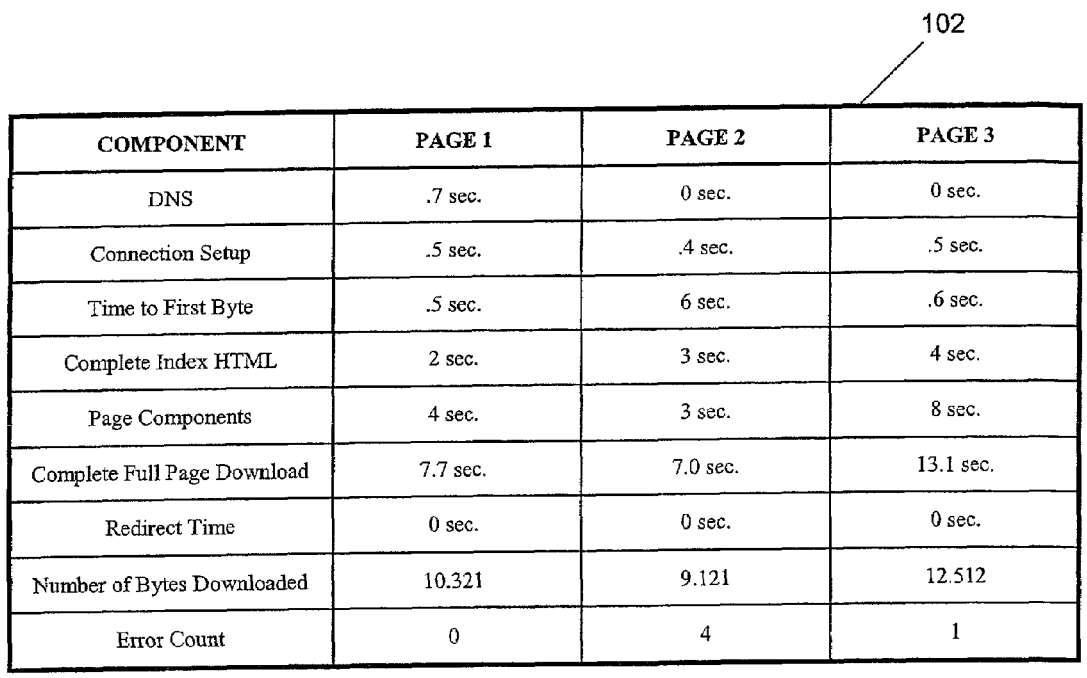
FIG. 7 is an exemplary table illustrating second level element download times for a transaction.

The system 10 may monitor a number of components during the transaction and breakdown the time of the entire transaction so that individual contributors may be analyzed. The data reported to the database 94 includes the overall time it took to complete a transaction (i.e., round trip response time for transaction) and component errors. Two additional levels of data are submitted to the database. The first is timing for the download of level one components. FIG. 6 shows a table 100 including sample download times for a transaction which requires the download of three web pages. The table 100 may also include steps that are completed by Java applets or Java scripts, for example. FIG. 7 shows a table 102 listing second level measurements including the time for individual parts of a file to download including DNS look up time, TCP connection setup, time taken to receive the first byte of information in response to an HTTP GET request, time to complete index HTML, time to download and decompress page components (e.g., GIF, JPEG), complete full page download time, redirect time, number of bytes downloaded, and error count. The individual components which are measured may include advertisement banners that appear on a web page, for example. This will let a web page owner know whether an advertisement banner is the slowest element on the page, or the banner is causing errors. Additional data such as the average login time and the percentage of successful logins may also be provided.

Whenever a page download completes successfully its measurement time is saved in the database. If an agent fails to download a page, it reports an error code (e.g., HTTP codes reported in the HTTP header, DNS lookup failure, transaction timeout, page timeout, expected navigation not found, keyword not found, JavaScript error) to the database. The agent may also report a time at which the error occurred. If an error occurs at any stage during downloading of the initial page the entire transaction is aborted. An error code is then reported for the entire transaction. If an individual element of a page such as a GIF causes an error, the error code and file are noted and the transaction continues. A list of GIFs or component URLs that failed may also be stored. If an intermediate step in the transaction fails, such as a search engine query does not return from the request and results in a page time out, the time and error may also be reported.

As described above, the recorder 80 is used to create the script files 82 which are executed by the agents 76 to collect performance measurements. The recorder 80 is used to capture a series of interactions that comprise a specific task or flow within a web site to be measured. Once a transaction has been recorded, the resulting script is saved under a selected name. After a transaction is recorded, it can be played back to allow the user to review and validate the script. During playback, the user may enter a series of predefined fields and notes to document the users intent in creating the script. This will help in troubleshooting a script that is not functioning properly. As further described below, the recorder provides visual cues and messages that reinforce the user's interaction with the transaction recorder to provide reliable scripts that reflect the user's intent.

When a user opens up the recorder application he can record a new transaction or open an existing transaction. After the recording is stopped the user can playback in either a run mode (go through entire transaction without stopping) or in a step mode (step through the transaction). After the playback is complete the transaction may be saved or submitted. A new transaction may then be recorded.

Figure 8:
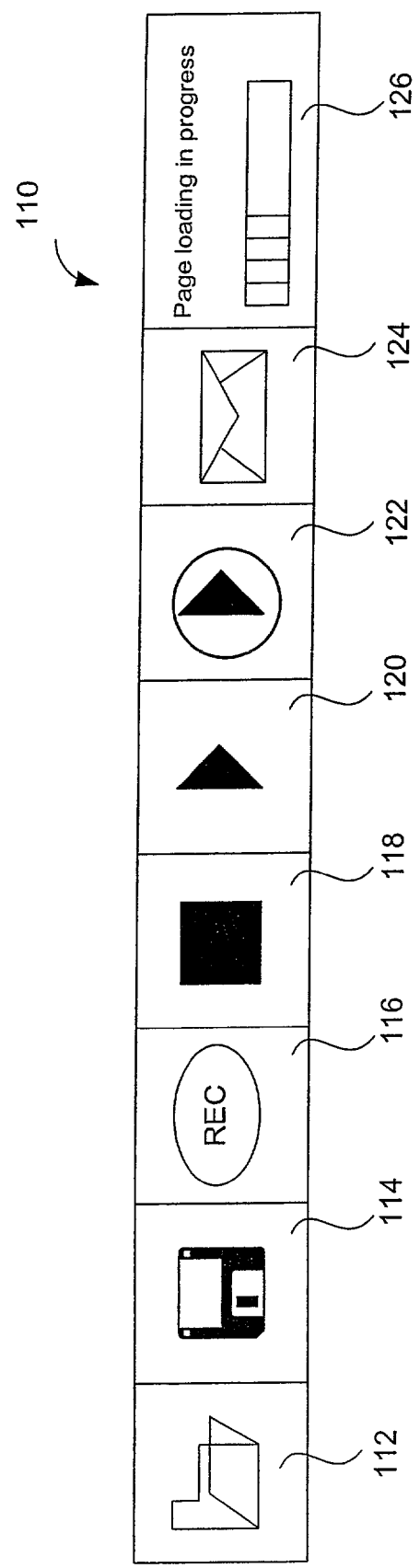
FIG. 8 is a diagram of a toolbar used to record, save, playback, and submit a transaction.
Figure 9:
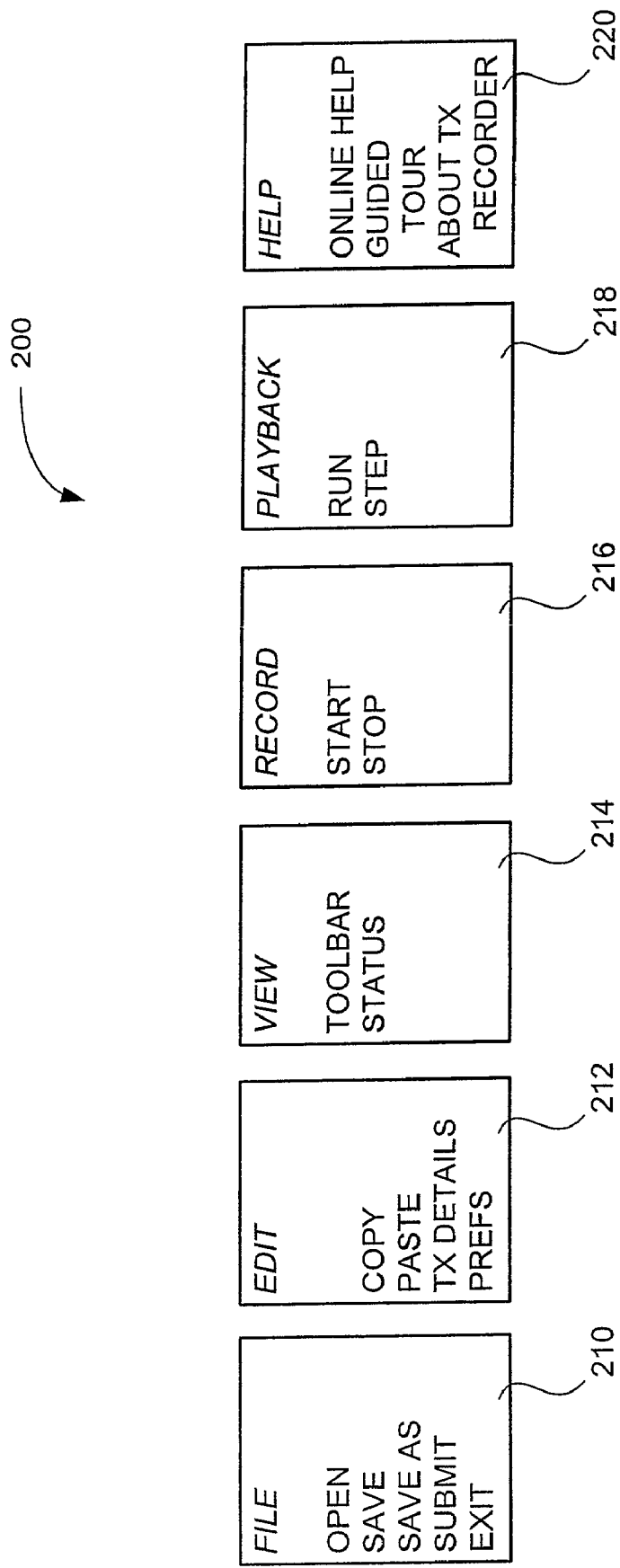
FIG. 9 is a diagram of a menu bar presented to a user of the system of FIG. 1 during recording, reviewing, saving, or submitting a transaction.

The transaction recorder 80 includes a user interface having a web page viewing area, a toolbar (generally indicated at 110 in FIG. 8), and menu selections (generally indicated at 200 in FIG. 9). The web page viewing area is the browser 77, which is embedded in the recorder 80 (FIG. 1). FIG. 8 illustrates an example of a toolbar used to record, review, save, and submit a transaction. The toolbar 110 includes a plurality of buttons 112, 114, 116, 118, 120, 122, 124, 126. The first button 112 is used to open a previously recorded transaction. Button 114 is used to save a recorded transaction. Button 116 is used to start the recording of a transaction and button 118 is used to stop the recording when the transaction is complete. Button 120 is used to playback the entire script for review of the transaction and button 122 is used to step through the series of web pages in a transaction one at a time. Button 124 is used to submit the final recorded transaction to the operations center 84. Button 126 shows the progress of a page loading during the recording of a transaction. The REC button 116 is preferably highlighted while a recording is in progress. It is to be understood that the toolbar may have different configurations or buttons and provide functions other than shown herein, without departing from the scope of the invention.

The menu items included in the recorder 80 may provide the same control as the toolbar 110 buttons along with other items that provide additional functionality for customizing script options. As shown in FIG. 9, the menu 200 may include, for example, file 210, edit 212, view 214, record 216, playback 218, and help 220 options. The file option 210 allows the user to open, save, submit, or exit a recording. The edit option 212 may be used to copy, paste, add transaction details, or preferences to a transaction. The view option 214 provides access to the toolbar 110 or provides the status of a recorded transaction. The record options 216 are used to start or stop a recording. The playback option 218 allows a user to playback and review a recorded transaction in run mode or step mode.

The help options 220 include access to online help, a guided tour, or information about the transaction recorder.

The menu may also include transaction options which allow a user to set an overall timeout (i.e., time limit) for the transaction. If a time limit is set and the transaction does not finish within the specified period of time when the script is run by the agent 76, the agent will stop the transaction. A page option may also be included to allow the user to select text that should either appear or not appear in order for the transaction to work properly. This allows a user to look for specific text which must appear in order to ensure that the correct page is reached when the agent 76 runs the script 82. Also, specific error pages which are commonly encountered may be specified as text that should not appear. If the conditions specified are not met when the script 82 is run, the transaction will result in an error code. These page options may be set when the script is replayed in step mode (button 122), for example. The script 82 may also be modified by an operator after it is sent to the operations center 84.

After the starting URL is entered, the pop-up control panel 110 (FIG. 8) appears on the computer screen (e.g., in a corner of the screen). Progress bar 126 shows the progress of the loading page. The record button 116 is highlighted to show that a recording is in progress. A windows status bar (not shown) may display the current URL. The only active button on the toolbar during recording is the stop button 118. As the website launches new browser windows, the control panel stays displayed on top. After the user has completed the transaction and clicks the stop button 118, the related website browser windows are closed and the control panel displays a message confirming the recording has stopped. The user can then playback the transaction in a continuous mode or a step mode. During the step mode, the user may add notes and additional processing checks (keywords, page timeout, etc.), or save the transaction which will prompt the user for a file name. During playback (step mode), all buttons are disabled except for the step mode button 112 and save button 114. The recorder panel may expand to allow the user to name the page, assign timeout, and add keywords, for example. The user may save changes during the playback step mode at any time by clicking on the save button 114.

After playback is competed a pop-up dialog box with a brief summary of the transaction is displayed. If the playback was successful the window displays a description of the pages downloaded during the transaction, the time to download each page and any errors or failures that occurred, along with the total transaction time. After viewing this box, the user may playback the transaction, save, submit, or view details of the transaction. If the playback was successful but errors were detected the window lists the errors. A different window is displayed if the playback was unsuccessful and errors were detected. The user may then playback or rerecord the transaction. If the playback attempt failed, the user is notified, at which time he may step through the transaction to change the parameters, keywords, or timeouts and run the transaction again. The user may need to rerecord the transaction if failure again occurs.

The recorder 80 preferably recognizes and saves HTML tags within the browser. Information about a tag (object) is saved during the record phase. The recorder is configured to recognize tags that are dynamically generated both at the server level (e.g., Active Server Pages) and at the browser lever (e.g., JavaScript).

The tags on a web page that a user may interact with include, for example, <INPUT.../>, <IMG.../>, <A.../>, <SELECT.../>, and <AREA.../> tags. The <INPUT.../> tag includes many subcategories, such as 'text', 'checkbox', 'radio button', 'submit', and 'reset'. Tags are preferably recognized during playback via exact matching which is accomplished with minimal length strings or sub strings. URLs are preferably not used for matching since they are subject to change on sites that employ server farms.

An example of a method for recording these tags is as follows. SELECT tags do not contain URLs and have a unique name on a page, therefore, they can be easily recognized and saved. The coordinate portion of an AREA tag (e.g., "cords=367,19,413,45") is saved during recording and searched for during playback. The coordinate portion of the AREA tag may be supplemented with an "alt=xxxxxxx" portion. Anchor tags (referred to as 'A' in HTML and 'links' in JavaScript) are recorded using the clickable text inside the anchor tags. For anchor tags containing an image and no text, the name of the image file is used. IMG tags typically have an 'src' parameter and may have an 'alt' parameter. The 'alt' parameter plus their image file name are used as unique identifiers. The INPUT tag's 'outerHtml' is acquired during recording and then compared to all other INPUT tags on the page. The minimum number of characters required to uniquely identify the tag on that page is calculated. This minimum string of characters is then used on playback to identify the desired tag.

Figure 10:
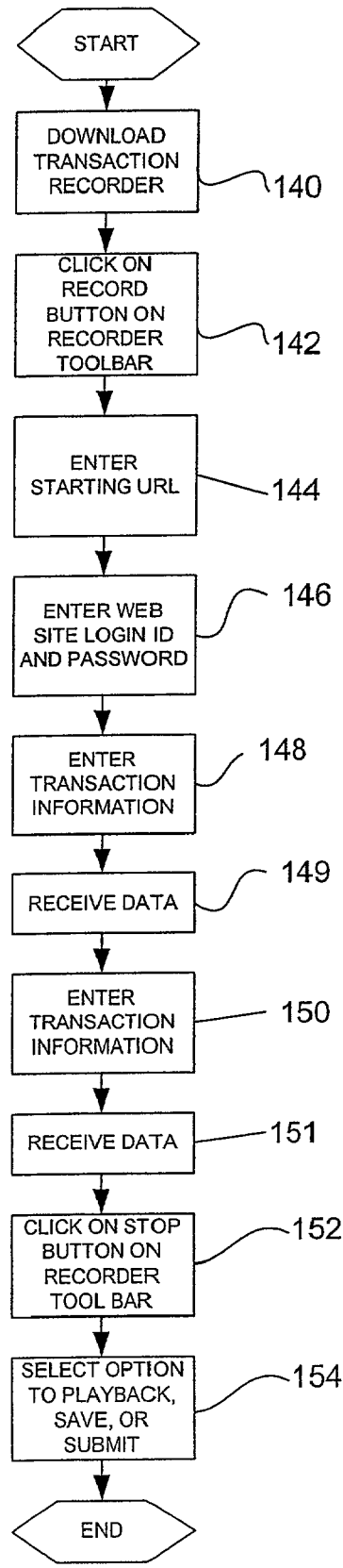
FIG. 10 is a process flowchart illustrating a process for recording a web site transaction.

FIG. 10 shows a flowchart illustrating a process for recording a transaction to create a script file 82. The transaction recorder 80 is first downloaded and launched at step 140. A user may enter a user ID and password if required. The user next clicks on the record button 120 on the recorder toolbar 110 and enters a starting URL (e.g., www.amazon.com) (steps 142 and 144). The user is then ready to execute the transaction. The user may be required to enter a user ID and password for the web site (step 146). This may be requested on the first page or subsequent pages during the transaction. If the user is buying a book, for example, the user may first enter a search query, and then enter the name of a book he wants to purchase after receiving the results of the query on the next web page. The user will then have to enter additional information, such as a credit card number and mailing address after a new web page is displayed and submit the order. This iterative process (shown in steps 148-151) may be repeated any number of times during the transaction. After the transaction is complete, the user clicks on the stop button 118 on the recorder toolbar 110 to complete the recording of the script file 82 (step 152). After the recording is stopped, the user is provided with the option to playback, save, or submit the recorded transaction (step 154).

Figure 11:
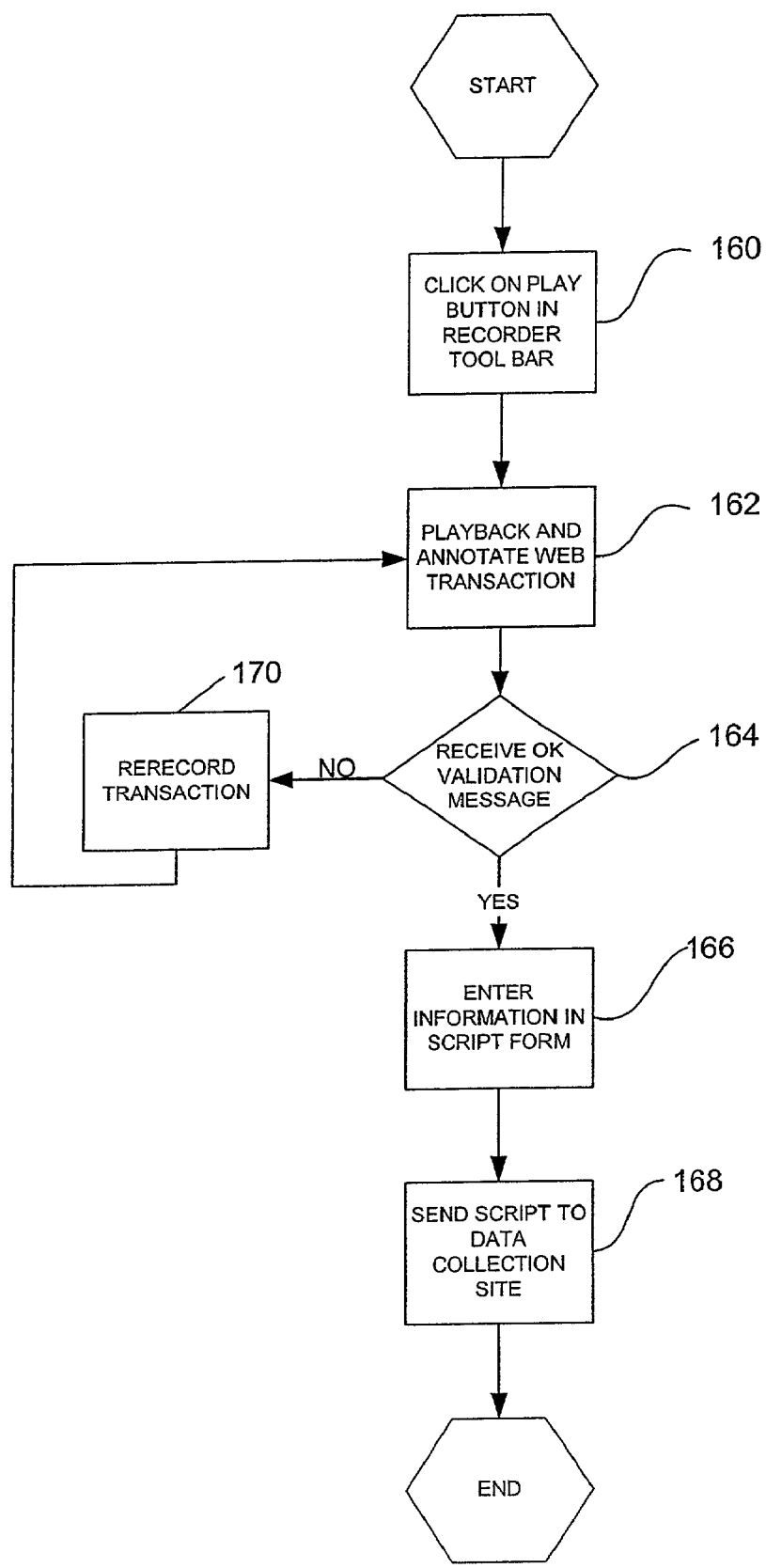
FIG. 11 is a process flowchart illustrating a process for playing back, annotating, and submitting a script containing a recorded transaction.

If the user selects to playback the transaction, the user clicks on the play button in the recorder toolbar 110 (step 160 of FIG. 11). The transaction is played for the user at which time the user may annotate the web transaction by inserting comments or notes throughout the transaction (step 162). These notes are used to remind the user of his intent during the recording of the transaction and help in correcting the script if errors 82 are later found. The user then receives a validation message that tells the user whether the script is functioning properly (step 164). If the script is running properly he may enter identification information (step 166) and send the script 82 to the data collection site (step 168). If the user decides to save or submit the recorded transaction, the user enters information such as his name, company, contact name, phone number, and e-mail. If the transaction is properly saved, the user will receive confirmation that the transaction was saved. If not, the user will select a location and filename to save the transaction which will then be saved in the specified location. If the transaction did not run properly, the user may attempt to rerecord the transaction (step 170).

Figure 12:
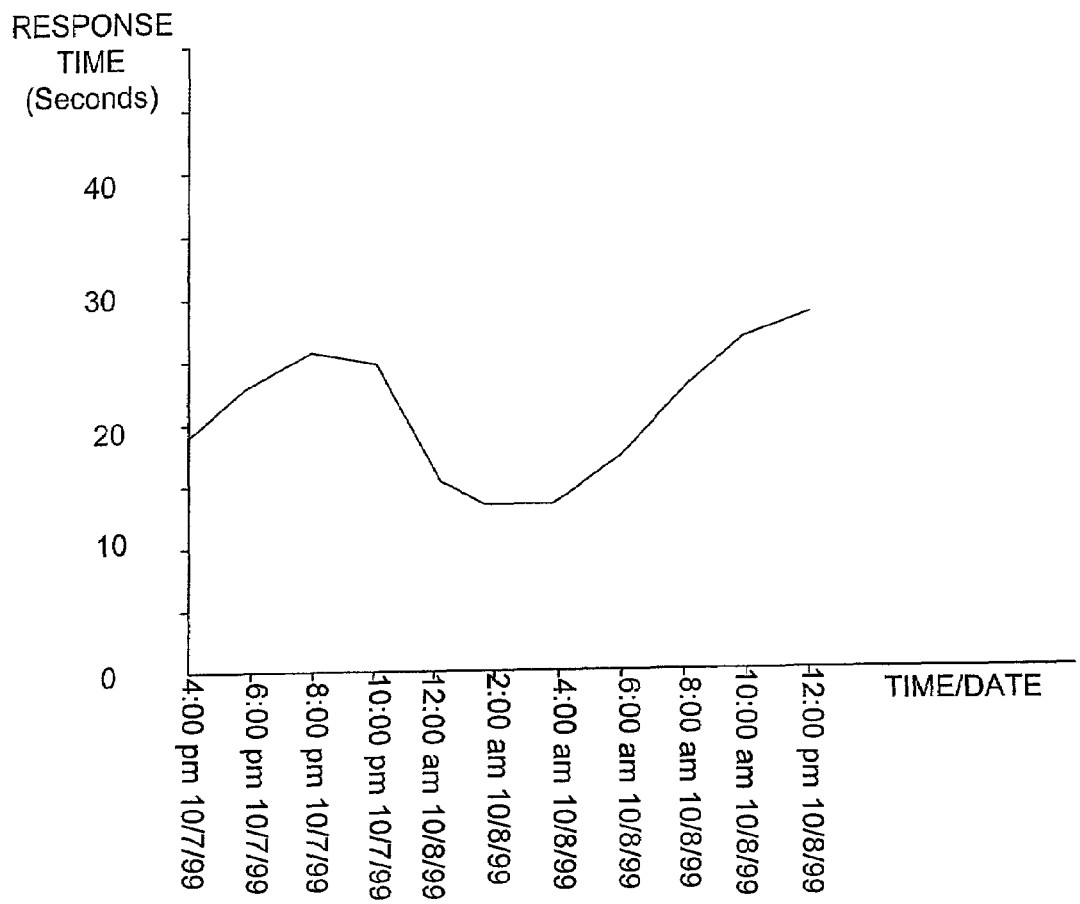
FIG. 12 is a graph illustrating web site performance at various times.
Figure 13:
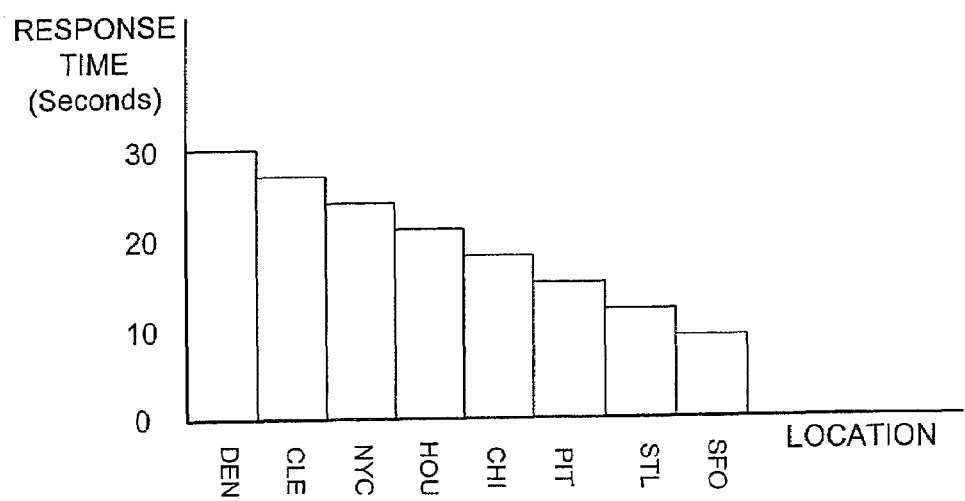
FIG. 13 is a bar chart illustrating web site performance at various locations.
Figure 14:
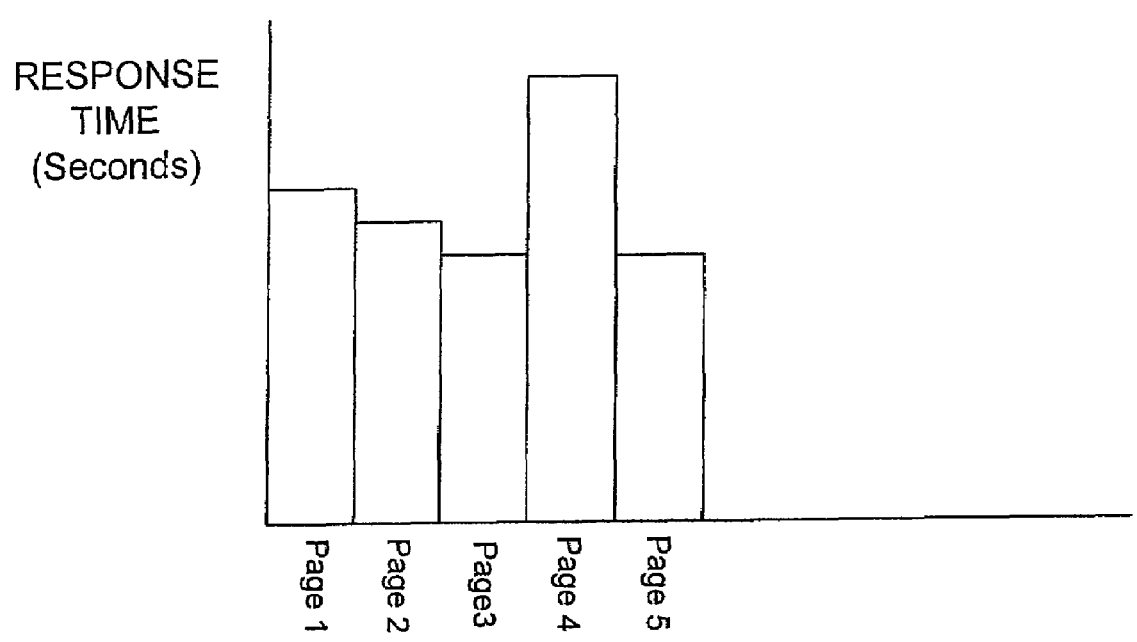
FIG. 14 is a bar chart illustrating web site performance for each web page displayed during a transaction.

After the script 82 is processed by the agents 76, the data collected by the agents may be viewed on a web site, for example. The data may also be sent via e-mail. A user may specify a list of scripts 82 for which performance data is desired by inputting a script file name. The user may also specify the type of performance data that is desired. FIGS. 12 and 13 illustrate various ways of displaying performance data to a user. FIG. 12 shows a graph wherein the typical download times experienced at a web site are plotted versus time. As shown in FIG. 12, the performance of a specific transaction web site may be plotted over a period of time at specific intervals (e.g., 1 hour). A graph of other web sites, such as a competitor's web site may also be plotted on the same graph to compare performance of web sites, for example. FIG. 13 is a bar graph showing the typical download times experienced by users at different geographic locations. Additional details may also be viewed for transactions at one or more of the locations to identify problems in a specific location. Each bar represents the average download time for a transaction that users in a particular city experienced. A similar chart may be provided with various networks (e.g., GTE, AT&T, Sprint) shown on the horizontal axis rather than the location. A graph showing download times for each page (as shown in FIG. 14) or page components may also be provided. Detailed information on errors may also be provided.

FIGS. 12, 13, and 14 are merely illustrative of several preferred ways of displaying data collected in accordance with the principles of the present invention, and many other display formats may be used. For example, the graphs may be modified to display the performance data from individual agents or the performance data for more than one transaction.

The system 10 may also include an alarm which automatically alerts the owner of a web site when the web site becomes unavailable to customers, due to problems with the server, the Internet link being down, or problems with a network provider. An alarm may be set, for example, if more than three cities show a response time fifty percent above a typical peak response time. Once an alarm is set, the system 10 may be used to determine if the problem is with the Internet, network provider, link to the Internet, web server, or web content. The alarm may be sent to a web page owner by e-mail or pager, for example. Alarms may have different settings based on different criteria for more than one user monitoring the same web site.

A method and system for evaluating transaction service to a user over the Internet has been disclosed. The method disclosed may also be applied to other network computing environments, including public or private networks or Intranets. Download time, or any other performance parameter that is desired, may be measured using an agent that monitors information as it is transmitted between parties.

Although the present invention has been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method of recording at a computer a transaction over a network between the computer and an information source, the method comprising:

starting a recorder at the computer;

sending a request for information from the computer to the information source over the network to begin the transaction;

recording the transaction including browser operations;
stopping the recorder;
playing back the recorded transaction for review and validation of the recorded transaction by a user at the computer;
inserting comments into the recorded transaction during playback of the recorded transaction in a step mode; and
sending the recorded transaction to a collection system for distribution to a data acquisition agent;
wherein the recorded transaction is configured for use by the data acquisition agent remote from the computer and operable to execute the recorded transaction with the information source and collect performance measurements for the transaction, performance measurements comprising download time of data during execution of said recorded transaction and including browser execution time.

2. The method of claim 1 wherein playing back the recorded transaction comprises generating a summary of the transaction for the user.

3. The method of claim 1 further comprising generating an error notification if the recorded transaction is not completed during playback and identifying that the error is due to missing data within the recording.

4. The method of claim 3 wherein the error notification contains one or more keywords or timeouts.

5. The method of claim 3 wherein receiving feedback further comprises receiving notification that the playback was unsuccessful.

6. The method of claim 5 further comprising repeating the steps of:
starting the recorder;
sending a request for information from the computer to the information source over the network to begin the transaction;
interacting with the information source over the network to complete the transaction; and
stopping the recorder.

7. The method of claim 1 further comprising playing back the recorded transaction in a continuous mode.

8. The method of claim 1 wherein the information source is one or more web servers and sending a request for information comprises requesting a web page.

9. The method of claim 8 further comprising sending the recorded transaction to the agent and the agent executing the recorded transaction.

10. The method of claim 9 wherein collecting performance measurements comprises collecting download time for each web page downloaded during the transaction.

11. The method of claim 10 wherein collecting performance measurements comprises collecting download time for individual components within each of the web pages.

12. The method of claim 9 wherein executing the transaction comprises sending a query from the data acquisition agent to the information source after data is loaded on the agent.

13. The method of claim 9 wherein executing the transaction comprises submitting an order from the data acquisition agent to the information source after data is loaded on the agent.

14. The method of claim 9 wherein sending the recording comprises sending the recording to a plurality of data acquisition agents at different geographic locations within the network.

15. The method of claim 1 further comprising creating a script file and sending the script file to an operations center for test.

16. The method of claim 15 further comprising receiving the script file at the operations center and storing the script file in a database comprising a plurality of script files.

17. The method of claim 16 further comprising sending said database to an agent and executing the script files by the agent.

18. The method of claim 17 wherein executing the script files comprises passing one of said plurality of script files to a browser installed on the agent.

19. The method of claim 17 further comprising collecting measurement data during execution of the script and sending the measurement data to a measurement database located at a database server.

20. The method of claim 1 wherein said performance measurements comprises overall time to complete a transaction including time to download one or more web pages on the computer by the browser.

21. The method of claim 1 wherein playing back the recording comprises passing the recorded transaction to the browser.

22. The method of claim 1 further comprising sending the recorded transaction to a remote network element and playing back the recorded transaction a plurality of times to test the recorded transaction under different operating conditions.

23. The method of claim 1 wherein web pages are not cached for use in playing back the recorded transaction.

24. The method of claim 1 wherein the browser is modified to allow access to information within web pages during collection of performance measurements.

25. The method of claim 1 wherein said starting, stopping, playing back, and sending comprises utilizing a tool bar of a user interface.

26. The method of claim 1 wherein playing back the recorded transaction comprises interacting with the information source.

27. A computer program product for recording at a computer and measuring a transaction over a network between the computer and an information source, the computer program product comprising:
computer code that starts a recorder at the computer;
computer code that sends a request for information from a computer to an information source over the network to begin the transaction;
computer code that records the transaction including browser operations;
computer code that stops the recorder;
computer code that plays back the recorded transaction for review and validation of the recorded transaction by a user at the computer;
computer code that inserts comments into the transaction during playback of the recorded transaction in a step mode; and
computer code that sends the recording of the transaction to a node on the network in communication with a data acquisition agent remote from the computer and operable to execute the recorded transaction with the information source and collect performance measurements for the transaction, performance measurements comprising download time of data during execution of said recorded transaction and including browser execution time; and
a computer-readable storage medium for storing the codes.

28. The computer program product of claim 27 wherein the computer readable medium is selected from the group consisting of CD-ROM, floppy disk, tape, flash memory, system memory, and hard drive.

29. A system for recording a transaction between two or more computers in a computer network, the system comprising:

a recorder configured to record a transaction between a user computer and a host computer, the recorder installed at the user computer;

a playback application configured to playback the recorded transaction and insert comments into the transaction during playback of the recorded transaction in a step mode at the user computer, wherein playback of the recorded transaction comprises sending a request for a web page from a browser at the user computer to a web server and interacting with the web server to complete said transaction;

memory configured to at least temporarily store the recorded transaction at the user computer; and a delivery device operable to send the recorded transaction to a central computer in communication with at least one data acquisition agent remote from the computer and operable to execute the recorded transaction and collect performance measurements for the transaction, wherein performance measurements comprise download time of data during execution of said recorded transaction and includes browser execution time.

30. The system of claim 29 wherein the recorder is configured to save information about HTML tags during a recording phase.

31. The system of claim 29 wherein the recorder comprises a recognition system operable to recognize HTML tags within a web page.

32. The system of claim 31 wherein the tags are recognized during playback via exact matching.

33. The system of claim 31 wherein the recognized tags include a tag selected from a group consisting of SELECT, AREA, ANCHOR, LINK, IMG, and INPUT tags.

34. The system of claim 29 wherein the transaction begins with the user computer sending a URL to the host computer.

35. The system of claim 34 wherein the transaction includes interaction between the user computer and the host computer.

36. The system of claim 29 further comprising a plurality of data acquisition agents at different geographic locations within the network, each of the data acquisition agents being in communication with the central computer.

* * * * *